United States Patent [19]

Tsujimoto

[11] Patent Number: 5,034,834
[45] Date of Patent: Jul. 23, 1991

[54] CASSETTE LOADING APPARATUS
[75] Inventor: Hisanaga Tsujimoto, Tokyo, Japan
[73] Assignees: Kabushiki Kaisha Toshiba, Kawasaki; Toshiba Audio-Video Engineering Co., Tokyo, both of Japan
[21] Appl. No.: 392,989
[22] PCT Filed: Nov. 11, 1988
[86] PCT No.: PCT/JP88/01134
§ 371 Date: Sep. 6, 1989
§ 102(e) Date: Sep. 6, 1989
[87] PCT Pub. No.: WO89/04538
PCT Pub. Date: May 18, 1989
[30] Foreign Application Priority Data
Nov. 11, 1987 [JP] Japan .................. 62-283014
[51] Int. Cl.$^5$ ............... G11B 5/008; G11B 15/675
[52] U.S. Cl. ....................... 360/96.5; 360/93
[58] Field of Search .................. 360/96.5, 96.6, 93
[56] References Cited
U.S. PATENT DOCUMENTS
4,628,382 12/1986 Okumura ................... 360/96.5
4,831,472 5/1989 Ando et al. ............... 360/96.5

FOREIGN PATENT DOCUMENTS
59-78565 5/1984 Japan .
61-130057 8/1986 Japan .
62-57952 4/1987 Japan .
63-49643 4/1988 Japan .

Primary Examiner—John H. Wolff
Assistant Examiner—Jefferson Evans
Attorney, Agent, or Firm—Cushman, Darby & Cushman

[57] ABSTRACT

According to this invention, drive posts (4) secured to a cassette holder (3) serving as a cassette loading apparatus for a VTR, for example, for horizontally holding a cassette slide in slide grooves (14) on arm levers (13) provided at arm gears (11), while abutting on one side thereof. Accordingly, by setting greater the width of the slide groove (14a) formed in the arm lever (13a) on the drive side, the center of the drive post (4a) on the drive side is deviated from the center line of the arm lever (13a). As a result, the drive post (4a) on the drive side and the drive post (4b) on the driven side can be set in phase by setting the phase delay of the arm lever (13b) on the drive side and the phase delay of the drive post on the drive side, which are caused by the backlash of gears including drive gears (18) that engage the arm gears (11) at a front loading time, approximately equal to each other. That is, the phase of the drive post (4a) on the drive side with respect to the drive post (4b) on the driven side can be freely adjusted by properly shaping the slide grooves formed in the arm levers (13). Accordingly, loading and unloading through a front type manipulation can be executed while keeping the right and left ends of the cassette (2) in parallel.

3 Claims, 9 Drawing Sheets

CASSETTE LOADING APPARATUS

TECHNICAL FIELD

The present invention relates to a cassette loading apparatus for use in a magnetic tape recording/reproducing apparatus, for example, and more particularly, to a front loading apparatus for loading a cassette from the front side of a video tape recorder (hereinafter referred to as VTR).

BACKGROUND ART

Recently, home VTRs use a front operational type cassette loading apparatus which loads (inserts) a cassette into a VTR at a predetermined position (where a tape is pulled out from the cassette) from the front side for tape recording/reproducing, and unloads (ejects) the cassette to the front side of the VTR after its use is finished.

Conventionally, this type of front loading apparatus (hereinafter referred to as FL) generally has a power mechanism coupled to a cassette holder for receiving a horizontally loaded cassette. In this case a drive gear is disposed on one side of the cassette holder and a driven gear on the other side. That is, the driven gear interlocks with the drive gear via a transmission mechanism.

Due to the backlash inevitable to a mechanism using gears, however, the above conventional FL causes a phase shift in view of the operational time between the drive gear and driven gear located at both ends of the cassette holder, at the times of cassette loading and unloading. This deviates the parallelism between the right and left edges of the cassette during operation, so that smooth loading and unloading cannot be provided.

DISCLOSURE OF THE INVENTION

This invention has been devised to cope with such problem, and aims at providing an FL type cassette loading apparatus which can eliminate a operational phase shift between a cassette holder and the right and left edges of a cassette at the time of loading and unloading the cassette to thereby keep the right and left sides of both the cassette holder and cassette parallel over the entire operational process.

To achieve the above objective, in a front type cassette loading apparatus comprising a cassette holder for holding a cassette horizontally, drive posts secured symmetrical at both sides of the cassette holder, a pair of arm gears with arm levers having slide grooves formed therein for engagement with the drive posts, an interlocking mechanism for interlocking the arm gears, a drive source for rotationally driving one of the arm gears and a pair of frames, having guide grooves formed therein for engagement with the pair of drive posts, the width of the slide groove formed in that of the pair of arm levers which is located on the drive side is set greater than the width of the slide groove formed in the arm lever on the driven side.

BRIEF DESCRIPTION OF THE DRAWINGS

The aforementioned object of this invention and other objects and features will become apparent in the following description of some embodiments given referring to the accompanying drawings in which.

BEST MODE OF CARRYING OUT THE INVENTION

First, a description will be given of the basic example of an FL type cassette loading apparatus according to this invention.

Figure 1:
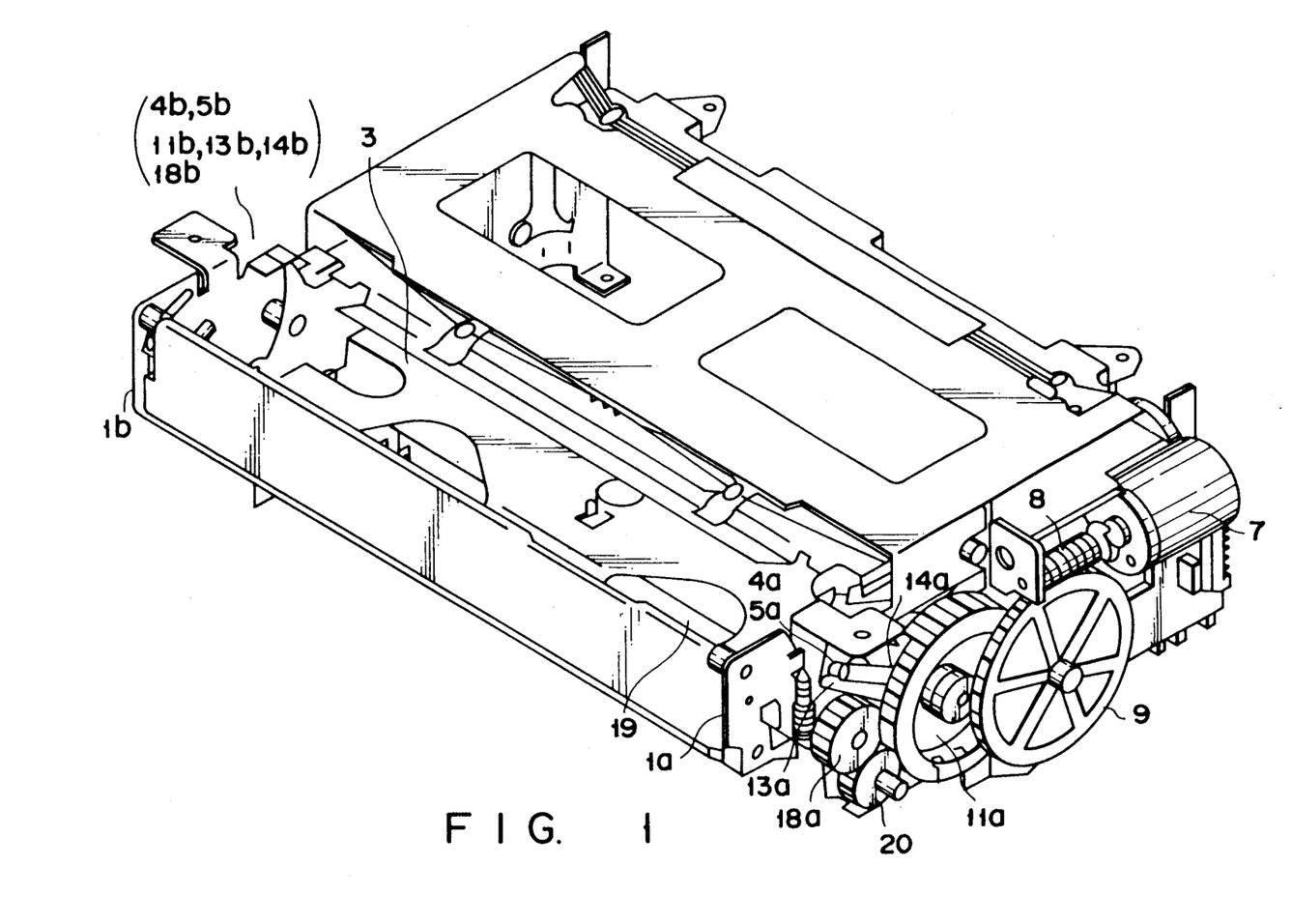
FIGS. 1 through 9 illustrate the basic example of a cassette loading apparatus according to this invention, FIG. 1 being an external perspective view of a front loading apparatus, FIGS. 2 to 5 being a top view, a right side view, a left side view and a front view, respectively, FIGS. 6 and 7 being diagrams, with the essential section taken from the right side view of FIG. 3 and simplified, for easy explanation of the operation, and FIGS. 8 and 9 being diagrams, with the essential sections taken from the right side view of FIG. 3 and the left side view of FIG. 4 and simplified, for easy explanation of the operation.
Figure 2:
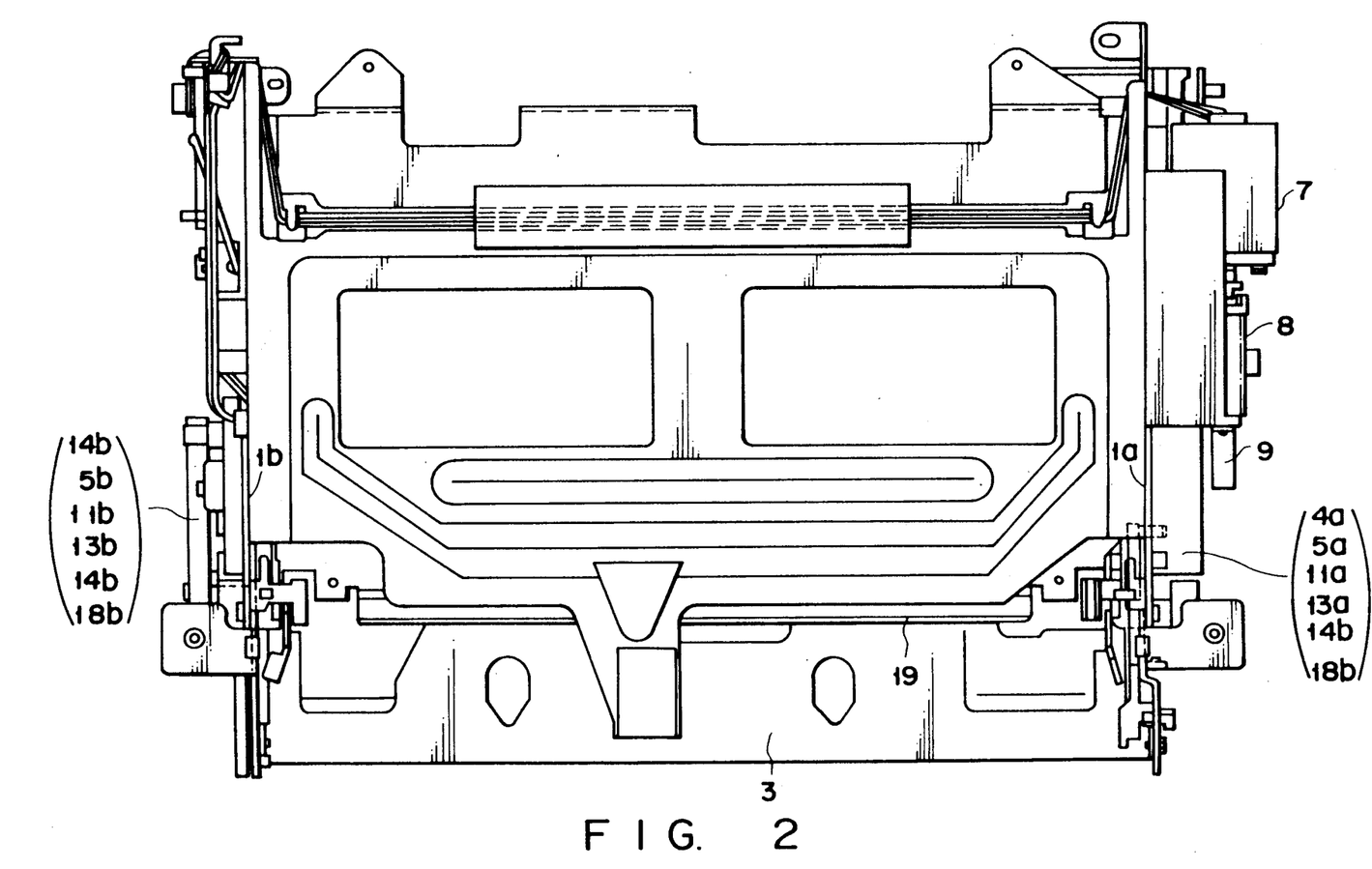
Figure 3:
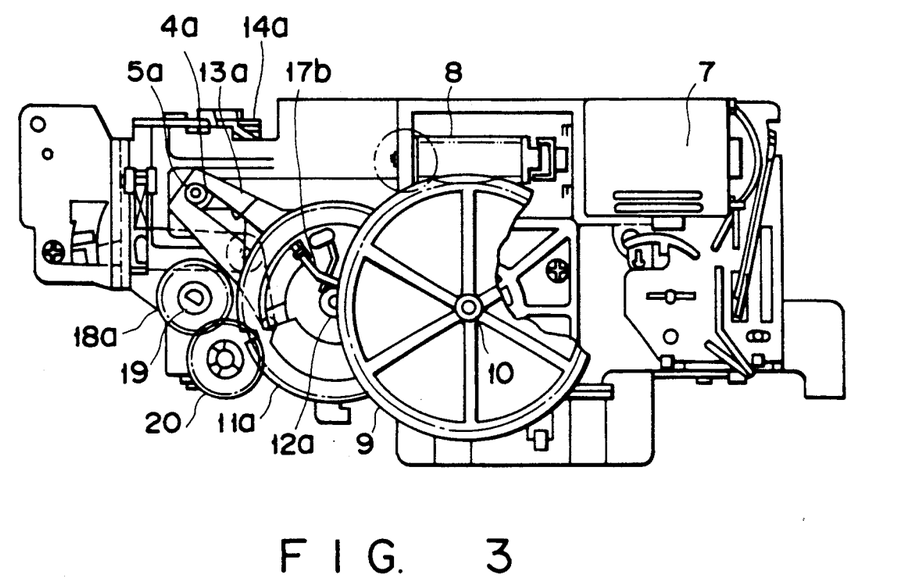
Figure 4:
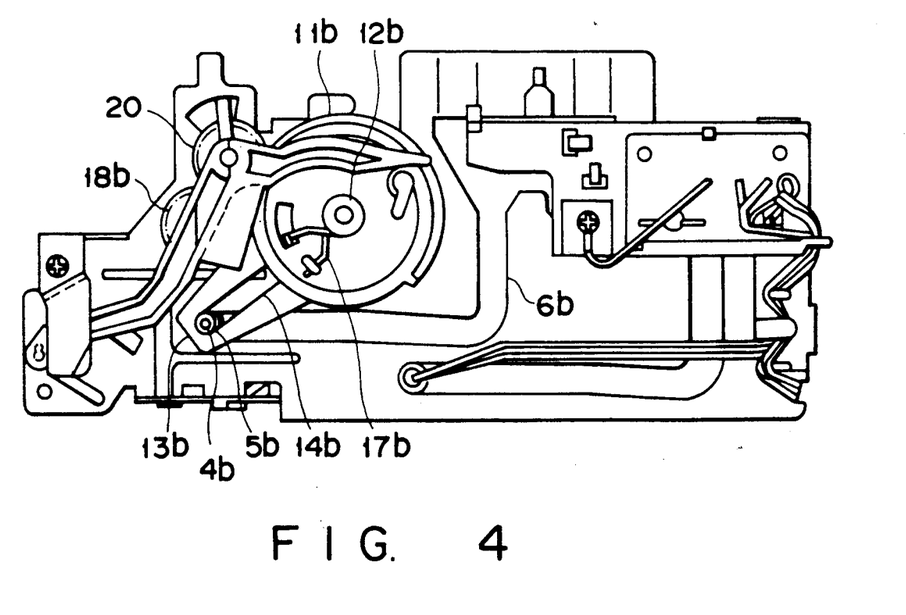
Figure 5:
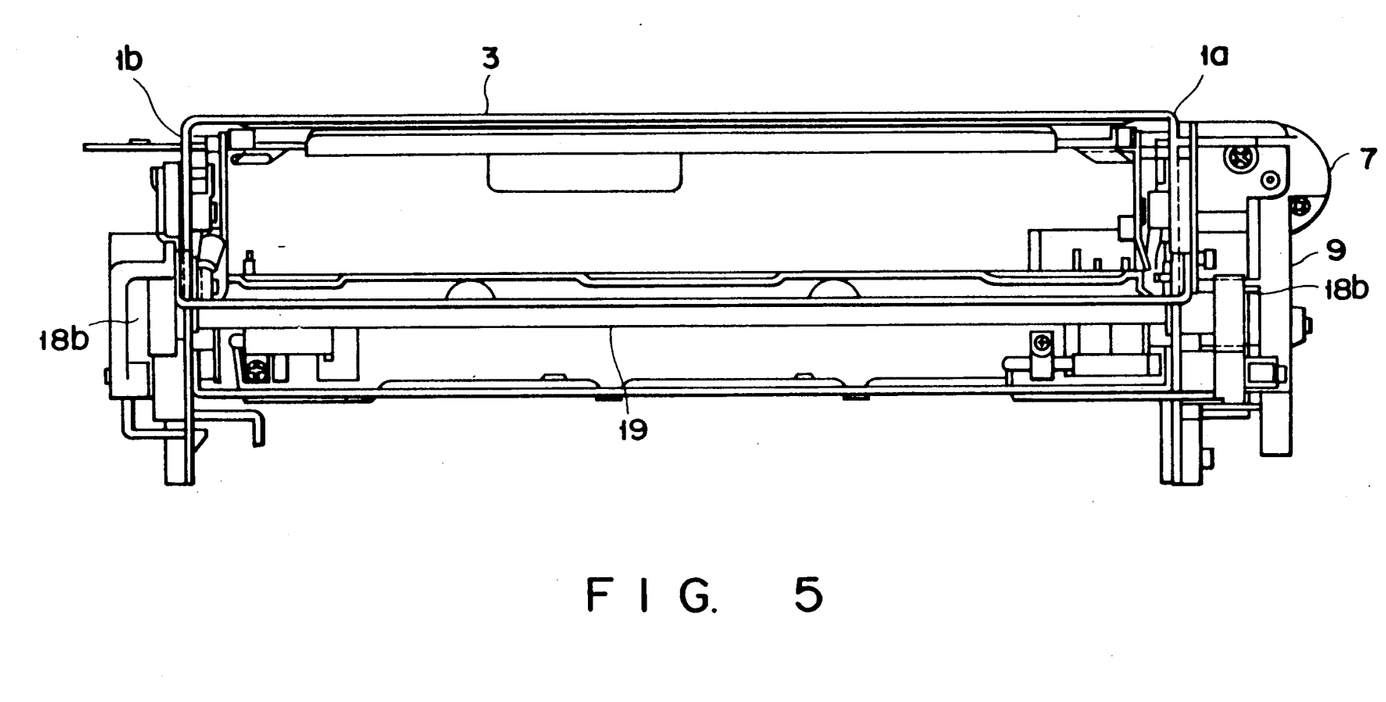
Figure 6:
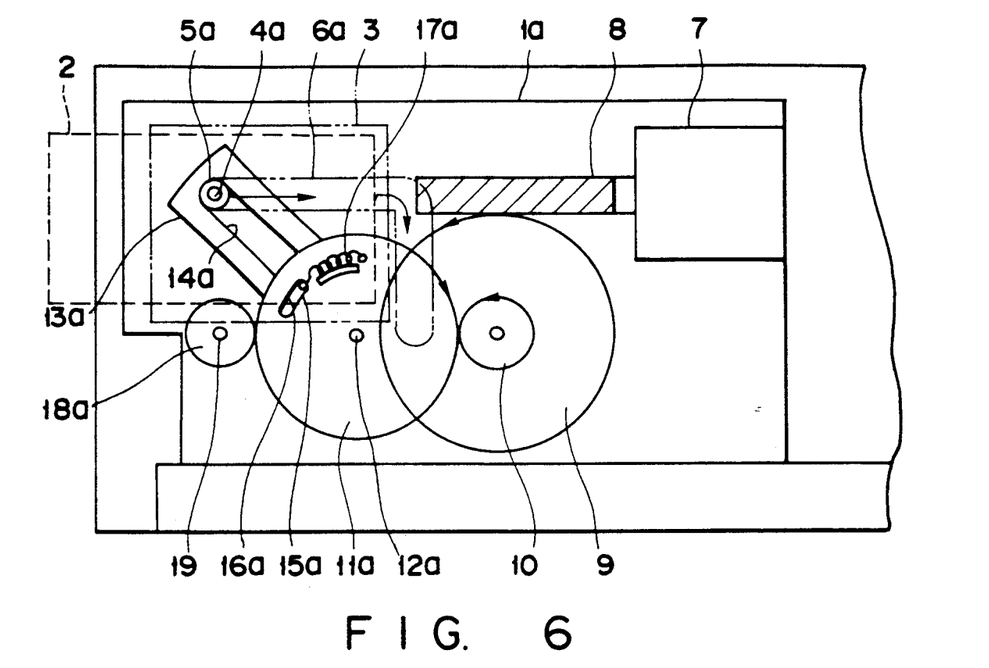
Figure 7:
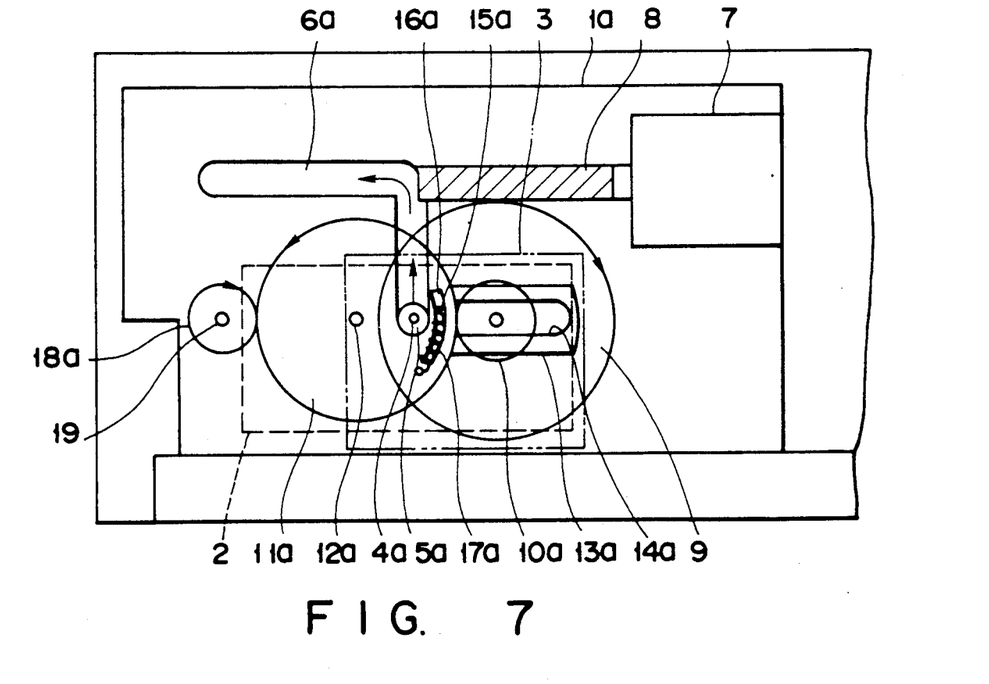

This FL type cassette loading apparatus is structured as illustrated in FIGS. 1 through 7. FIG. 1 is an external perspective view, and FIGS. 2 to 5 are a top view, a right side view, a left side view and a front view, respectively. FIGS. 6 and 7 are diagrams, with the essential section taken from the right side view of FIG. 3 and simplified, for easy explanation of the operation.

The following describes only those common in the individual diagrams and essential to this invention.

Referring to the individual diagrams, a cassette holder 3 for loading and holding a cassette 2 is movably provided between a pair of body frames 1a and 1b of a VTR, for example. Drive posts 4a and 4b are secured to both sides of the cassette holder 3 at symmetrical positions. Guide rollers 5a and 5b are mounted rotatable on these drive posts 4a, 4b. The drive posts 4a, 4b are engaged, via guide rollers 5a and 5b, with L-shaped guide grooves 6a and 6b formed symmetrical in a pair of body frames 1a and 1b. A loading motor (hereinafter referred to as FL motor) 7 is secured to one side (1a) of the frame pair 1a, 1b. A worm gear 8 coupled to the drive shaft of this FL motor 7 is engaged with a worm wheel 9 supported rotatable on the frame 1a. A middle gear 10 is secured coaxial on this worm wheel 9, and is engaged with an arm gear 11a supported rotatable by the frame 1a. One end of an arm lever 13a protruding from the arm gear 11a in the radial direction is supported rotatable on a support shaft 12a of the arm gear 11a. The aforementioned guide roller 5a is engaged in a slide groove 14a formed in the arm gear 13a in the radial direction. A pin 15a is embedded in the proximity of the base section of the arm lever 13a, and is engaged with a groove section 16a formed concentrical in the arm gear 11. A pre-load spring 17a, which has one end secured to the arm gear 11a, is engaged at the other end with this pin 15a, so that a pre-load will be given to the cassette holder 3 when the cassette 2 is loaded at a predetermined position. An arm gear 11b and an arm lever 13b, having the same relation with the arm gear 11a and arm lever 13a, are provided on the side of the frame 1b at symmetrical positions. The pair of arm gears 11a and 11b will have power transmitted by a shaft 19 through drive gears 18a and 18b, engaged with the arm gears. FIG. 6 illustrates the state in which the cassette 2 is at the initial position where it mounted on the cassette holder 3. FIG. 7 illustrates the state in which the cassette holder 3 being driven is at the loading position where a tape is pulled from the cassette. In this basic example, the slide grooves 14a, 14b formed in the arm levers 13a, 13b have a symmetrical shape.

Figure 8:
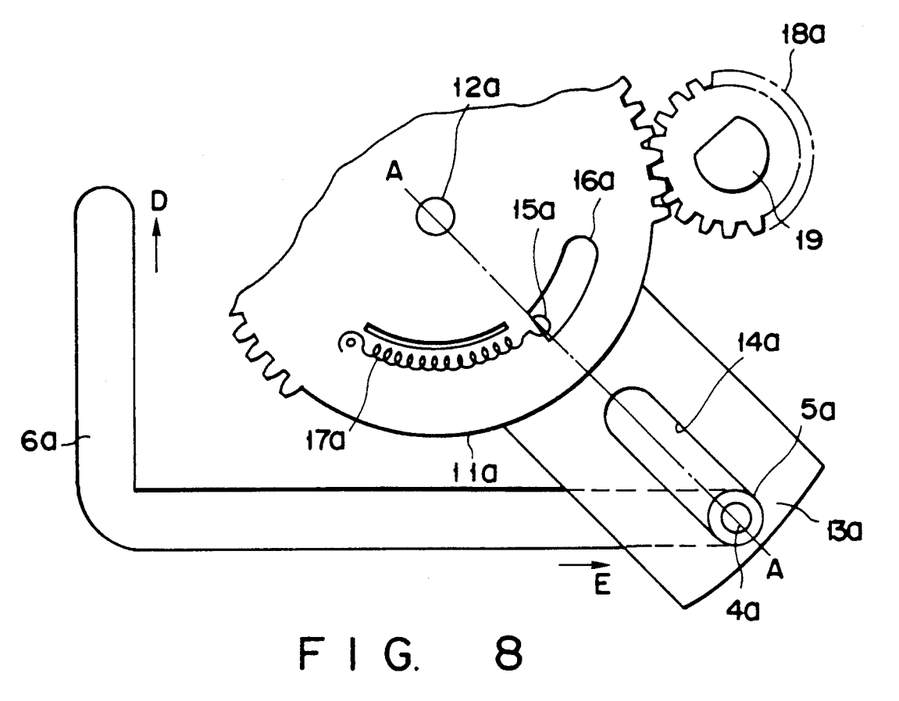
Figure 9:
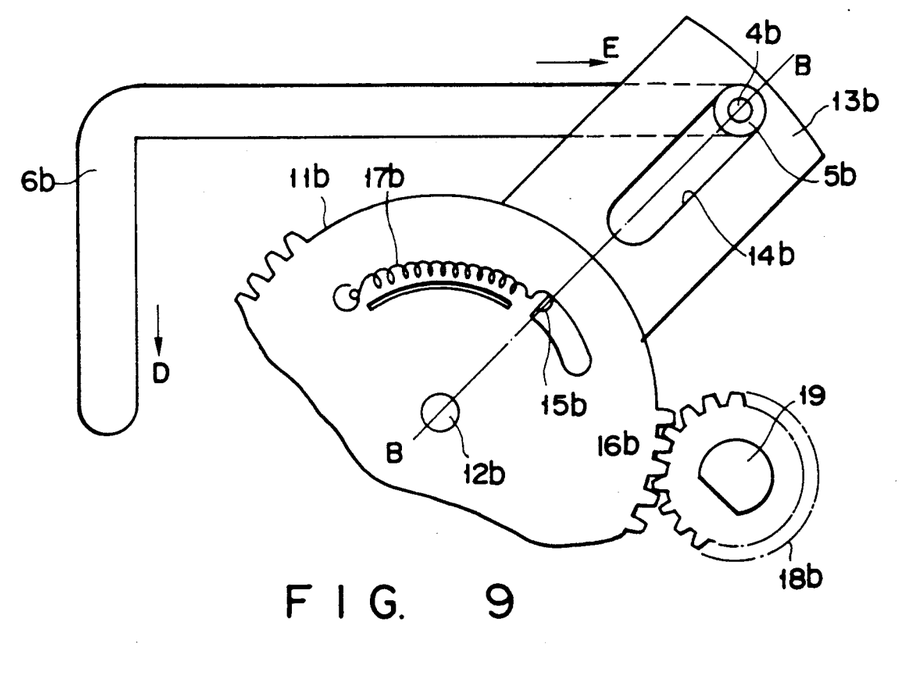

The operation of the FL constructed as above will be described referring to FIGS. 6, 8 and 9. As shown in FIG. 6, the rotation of the FL motor 7 is transmitted to the arm gear 11a on the driven side through the worm gear 8, worm wheel 9 and middle gear 10. This rotation of the arm gear 11a is transmitted to the arm lever 13a by making the pin 15a embedded in the arm lever 13a abut on one end of the groove section 16a formed in the arm gear 11a. Further, the drive post 4a secured to the cassette holder 3 is moved in the direction of the arrow D via the guide roller 5a engaging the slide groove 14a formed in the arm lever 13 and is guided along the guide groove 6a, thereby moving the cassette holder 3 in the direction of the arrow D. Meanwhile, power is transmitted to the arm gear 11b on the driven side shown in FIG. 9 through the drive gear 18a engaged with the arm gear 11a on the drive side, the shaft 19 and the drive gear 18b engaged with the arm gear 11b on the driven side, and the cassette holder 3 will be moved in the same manner.

If the improvement of this invention as described later is not made in such an operation, however, there exists a backlash between the arm gears 11a, 11b and drive gears 18a, 18b on the drive and driven sides. This causes a phase shift between the center lines A—A and B—B respectively connecting the centers of the right and left arm gears 11a, 11b to the drive posts 4a and 4b. Since the pair of guide rollers 5a, 5b move approximately on the center lines A—A and B—B, respectively, the guide roller 5b on the driven side always moves later than the guide roller 5a on the drive side at the operation time even if the center lines A—A and B—B are first set in phase.

In order to provide the parallelism of the right and left of the cassette when unloading it, the center line B—B on the driven side should be shifted with respect to the center line A—A on the drive side in the cassette unloading direction indicated by the arrow E by the backlash of the aforementioned two pairs of gears 11a, 18a and 11b and 18b. In this case, however, the center line B—B will be further delayed at the time of loading the cassette as indicated by the arrow D, as compared with the case where the center lines A—A and B—B are set in phase, and the right and left unbalance tends to increase at the time the cassette is set down or mounted with pressure. On the other hand, to match the phase in the cassette down operation and cassette mounting with pressure at the time the cassette is loaded, the center line B—B should be shifted in the direction of the arrow D with respect to the center line A—A by the backlash. In this case the parallelism of the right and left of the cassette is deteriorated at the time of unloading the cassette as indicated by the arrow E.

As described above, according to the FL of the basic example, when the pair of arm gears are rotated interlockingly via the drive gears and the cassette holder is moved by the arm levers that rotate together with the arm gears, the center lines of the pair of arm levers do not coincide with each other due to the backlash caused by the engagement of the arm gears with the drive gears. Further, if adjustment is made to set the center lines in phase at the time of loading or unloading the cassette, the phase shift will become greater at the time of the reverse operation.

Referring to the diagrams, a description will now be given of an FL type cassette loading apparatus according to one embodiment of this invention which solves the above problems.

Figure 10:
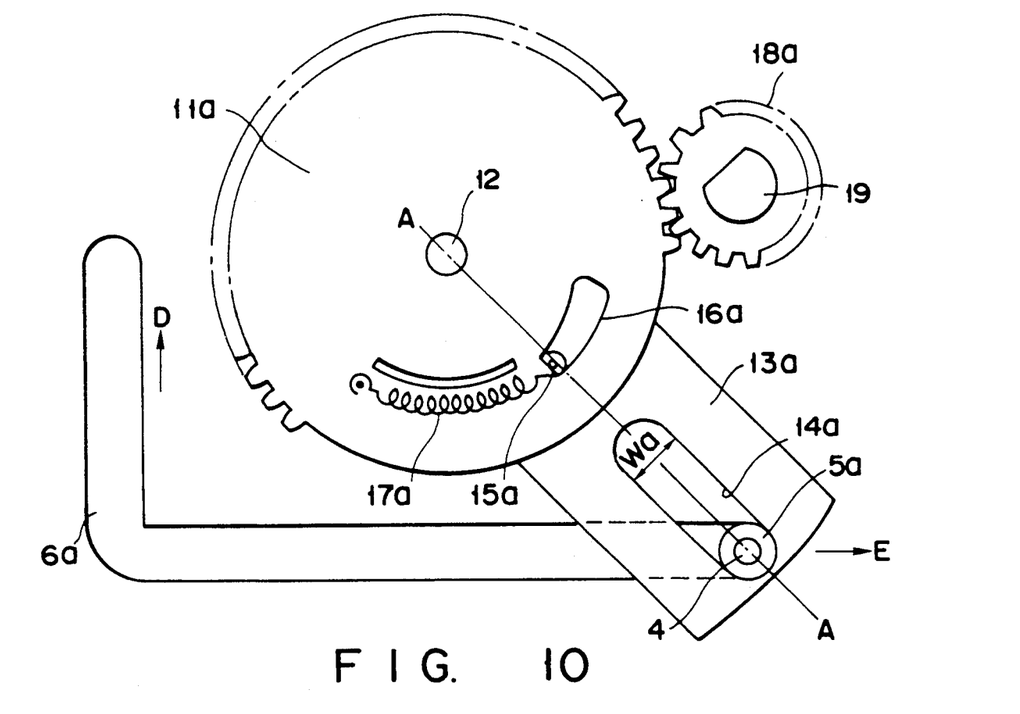
FIGS. 10 and 11 are side views illustrating the drive side and driven side of a cassette loading apparatus according to one embodiment of this invention.
Figure 11:
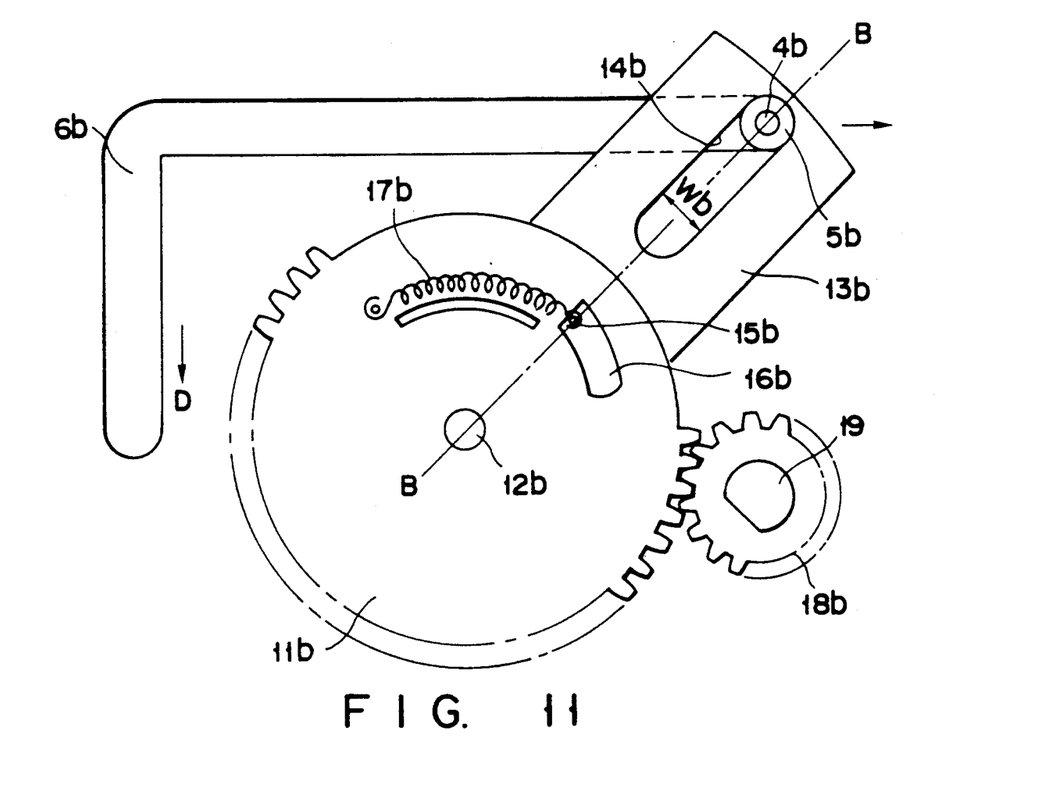

FIGS. 10 and 11 are side views illustrating in contrast the drive side and driven side of one embodiment of this invention. In these diagrams, the same reference numerals are given to identical or equivalent sections of the basic example shown in FIGS. 1 through 7 and FIGS. 8 and 9, thereby omitting their description. The feature of this embodiment lies in the shapes of slide grooves 14a and 14b formed in the arm levers 13a and 13b, and the other sections are the same as those of the basic example. The width Wa of the slide groove 14a formed in the arm lever 13a on the drive side shown in FIG. 10 is greater than the width Wb of the slide groove 14b formed in the arm lever 13b on the driven side. The width Wb of the slide groove 14b on the driven side is nearly equal to the diameter of the guide roller 5b, and the width Wa of the slide groove 14a is formed in such a way as to make the amount of the phase shift of the guide rollers 5a, 5b, caused by the backlash resulting from the engagement of the gears 11a, 18a and 11b, 18b, equal to (Wa−Wb).

The operation of the present embodiment will be described referring to FIG. 12. As the guide roller 5b on the driven side is engaged almost without a gap, with the slide groove 14b formed in the arm lever 13b on the driven side, the phase of the guide roller 5b always coincides with the center line B—B of the arm lever 13b. Assume that the guide rollers 5a, 5b move in the sequence of $P_1 \to P_2 \to P_3 \to P_4 \to P_5 \to P_6 \to P_7 \to P_8$ between the positions $P_1$ and $P_8$ where the cassette 2 is mounted to and detached from the cassette holder 3, the loading positions $P_4$ and $P_5$ where the tape is pulled out from the cassette, and the middle positions $P_2$, $P_3$, $P_6$ and $P_7$ there between. In the operation at $P_1$, since the guide rollers 5a, 5b are pushed by a hand, the right and left have the same phase. In the operation at $P_2$, the center line B—B of the arm lever 13b on the driven side will have a phase delay with respect to the center line A—A of the arm lever 13a on the drive side. Since the guide roller 5a is also at the phase delay position with respect to the center line A—A of the arm lever 13a, however, the center line A—A coincides with the center line B—B of the arm lever 13b on the driven side. The same applies to the operations at the positions $P_3$ to $P_7$. In the operation at $P_8$, the guide roller 5a on the drive side tends to be slightly advancing; however, this does not raise any problem in consideration of the safety of the cassette holder in slot out status.

According to this embodiment, the feeding phase shift of the right and left sides of the cassette holder resulting from the backlash between two pairs of gears 11a, 18a and 11b, 18b can be eliminated and the parallelism of the cassette at the slot out time of the cassette can be made equal to the pressure on the right and left of the cassette at the slot down time.

Figures 12, 13, 14:
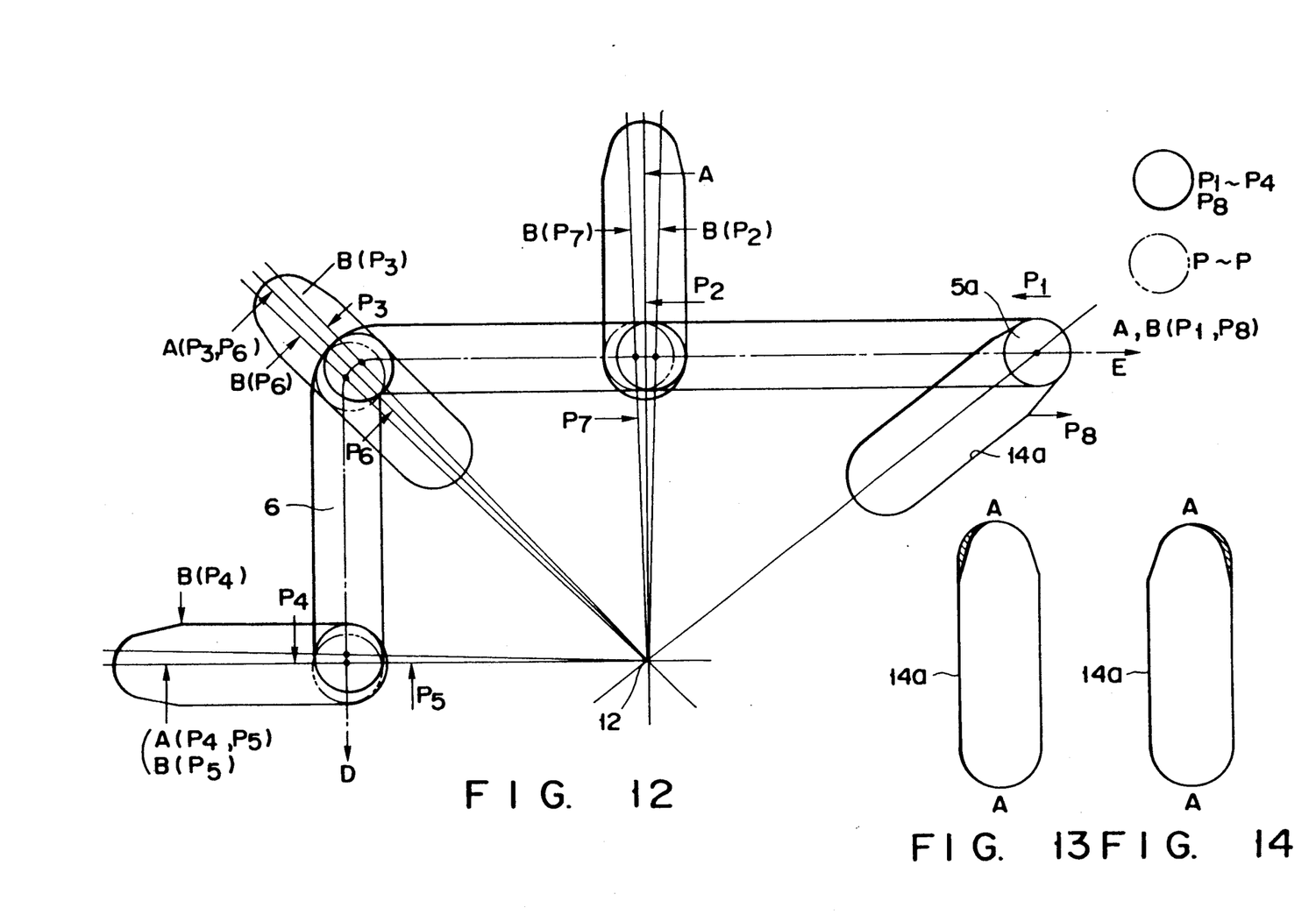
FIG. 12 is a diagram illustrating the operation of the same embodiment.
FIGS. 13 and 14 are plan views illustrating slide grooves according to other embodiments of this invention.

FIGS. 13 and 14 illustrate other embodiments of this invention. According to the embodiment shown in FIG. 13, that portion, indicated by the slant lines, of the peripheral side of a slide groove 14a formed in the arm lever 13a on the drive side on which the guide roller 5a abuts at the unloading time is removed. According to this embodiment, since the phase delay of the guide roller 5a occurs in the operation at the position P$_8$ in FIG. 12, the phase shift can be eliminated.

According to the embodiment shown in FIG. 14, that portion, indicated by the slant lines, of the peripheral side of a slide groove 14a formed in the arm lever 13a on the drive side on which the guide roller 5a abuts at the loading time is removed. According to this embodiment, it is possible to eliminate the phase shift caused in a case where the cassette 2 is driven from the beginning at the position P$_1$ in FIG. 13.

Figure 15:
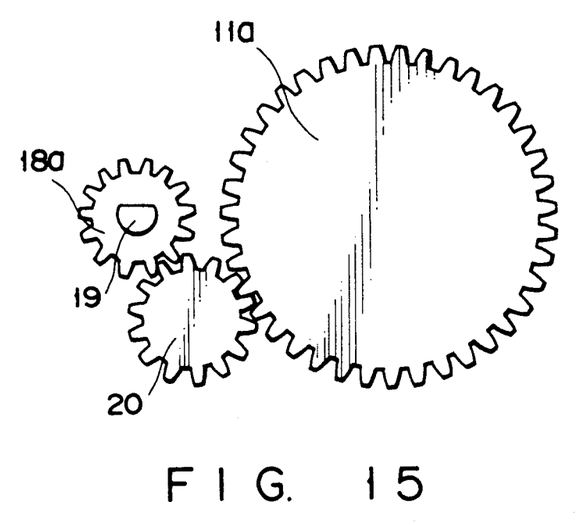
FIGS. 15 and 16 are detailed diagrams of the essential sections of FIGS. 10 and 11.
Figure 16:
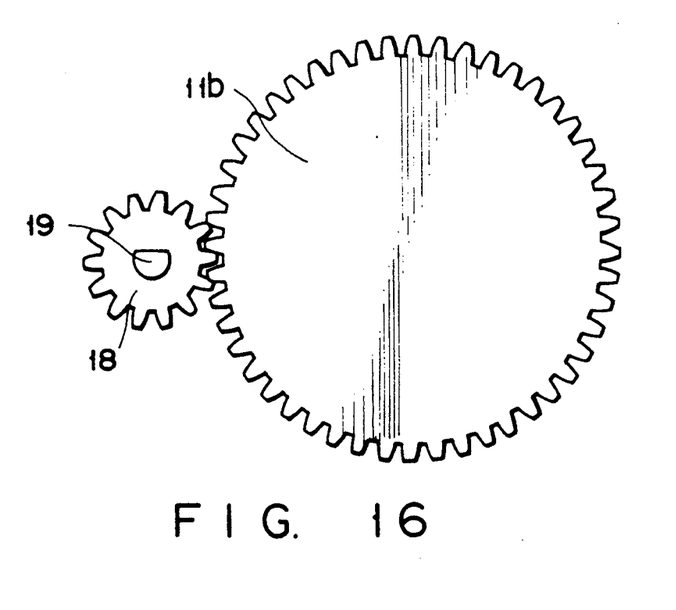

Although the foregoing description has been given with reference to the arm gear 11a on the drive side being directly engaged with the drive gear 18a, the engagement is actually made via an intermediate gear 20 as shown in FIG. 15. The arm gear 11a on the drive side has a smaller diameter than the arm gear 11b on the driven side shown in FIG. 16 by the intervention of the intermediate gear 20. These contribute to providing synchronization of the right and left ends of the cassette holder 3.

As describe above, according to this invention, since the width of the drive side slide groove, one of two which are formed in a pair of arm levers for driving a cassette holder and engaged with drive posts secured to the cassette holder, is set greater than that of the driven side slide groove, the phase shift of the right and left of the cassette holder caused by the backlash of the gears that interlockingly drive the pair of arm levers can be eliminated, the cassette holder and cassette can be held in parallel over the entire operational process, and the cassette mounting pressures on the right and left of the cassette at the time of mounting it can be made uniform.

INDUSTRIAL APPLICABILITY

This invention can be utilized in a system for loading a cassette by front operation, and is particularly suitable as a front loading apparatus in a VTR.

I claim:
1. A cassette loading apparatus comprising:
   a cassette holder for holding a cassette horizontally, said holder having at least two side supports;
   a pair of first and second drive posts, having a pair of first and second guide rollers each of a predetermined size, and provided on one of said at least two side supports of said cassette holder;
   a pair of first and second arm levers, said first arm lever having a first slide groove formed therein, said first slide groove engaging said first guide roller, said second arm lever having a second slide groove formed therein, said second slide groove engaging said second guide roller;
   a pair of first and second arm gears, said first arm gear being provided integral with said first arm lever, said second arm gear being provided integral with said second arm lever;
   a drive mechanism for driving said first arm gear so as to cause it to rotate;
   a transmission mechanism, provided between said first and second arm gears, for transmitting rotation of said first arm gear to said second arm gear; and
   a pair of first and second frames, said first frame having a first guide groove formed therein, said first guide groove engaging said first guide roller, said second frame having a second guide groove formed therein, said second guide groove engaging said second guide roller, each of said first and second guide grooves having a configuration that allows the cassette cassette mounted position and a cassette detached position; and
   wherein each of said first and second slide grooves has, at a position corresponding to said cassette mounted and detached positions, a width allowing said first and second guide rollers to have the same phase, and said first slide groove has, at a position other than said position corresponding to said cassette mounted and detached positions, a width greater than that of said second slide groove.

2. A cassette loading apparatus according to claim 1, wherein a part of that portion of said first slide groove which has the width allowing the same phase to said first and second guide rollers is removed at a region where said first slide groove and said first guide roller are in contact with each other when the cassette is located at said cassette detached position.

3. A cassette loading apparatus according to claim 1, wherein a part of said that portion of said first slide groove which has the width allowing the same phase to said first and second guide rollers is removed at a region where said first slide groove and said first guide roller are in contact with each other when the cassette is located at said cassette mounted position.

* * * * *